US012779420B2

(12) United States Patent
Palmisano et al.

(10) Patent No.: US 12,779,420 B2
(45) Date of Patent: Nov. 3, 2026

(54) PHOTOCATALYTIC BATCH REACTOR OPERABLE FOR CONVERTING GASEOUS, LIQUID, AND SUPERCRITICAL CARBON DIOXIDE

(71) Applicant: Khalifa University of Science and Technology, Abu Dhabi (AE)

(72) Inventors: Giovanni Palmisano, Abu Dhabi (AE); Samar B. Al-Jitan, Abu Dhabi (AE)

(73) Assignee: Khalifa University of Science and Technology, Abu Dhabi (AE)

( * ) Notice: Subject to any disclaimer, the term of this patent is extended or adjusted under 35 U.S.C. 154(b) by 851 days.

(21) Appl. No.: 18/313,269

(22) Filed: May 5, 2023

(65) Prior Publication Data

US 2023/0381726 A1 Nov. 30, 2023

Related U.S. Application Data

(60) Provisional application No. 63/345,862, filed on May 25, 2022.

(51) Int. Cl.
*B01J 3/00* (2006.01)

(52) U.S. Cl.
CPC .................................... *B01J 3/008* (2013.01)

(58) Field of Classification Search
CPC ........ B01J 3/008; B01J 19/0093; B01J 19/02; B01D 53/86; B01D 2257/504; B01D 2258/06; B01D 2255/802; B01D 2255/10; C01B 32/50; F25J 3/08; F25J 2220/82; F25J 2215/80; F25J 2205/84; F25J 2205/10; F25J 2235/80; F25J 2290/62; F25J 2240/60; F25J 2280/02; F25J 2230/30; F25J 2260/80
See application file for complete search history.

(56) References Cited

U.S. PATENT DOCUMENTS

2004/0131516 A1* 7/2004 Jackson ................. C01B 32/50
422/198

OTHER PUBLICATIONS

D. Blake, “Photocatalytic and Chemical oxidation of organic compounds in Supercritical carbon dioxide”, Project Report, 2000 (Year: 2000).*

(Continued)

*Primary Examiner* — Xiuyu Tai
(74) *Attorney, Agent, or Firm* — Kilpatrick Townsend & Stockton LLP

(57) ABSTRACT

A photocatalytic batch reactor can include a reactor vessel configured to receive a photocatalyst, the housing having an inlet, an outlet, and an opening configured to allow light to pass into the interior volume. The photocatalytic batch reactor can include a carbon-dioxide pump that is configured to pressurize carbon-dioxide en route to the reactor vessel. The photocatalytic batch reactor is operable in a gas state in which gas carbon-dioxide is supplied to the reactor vessel from a gas carbon-dioxide container. The photocatalytic batch reactor is also operable in a liquid state in which liquid carbon-dioxide is supplied to the reactor vessel from a liquid carbon-dioxide container. The photocatalytic batch reactor is also operable in a supercritical state, in which supercritical carbon-dioxide is supplied via the carbon-dioxide pump.

10 Claims, 5 Drawing Sheets

(56) References Cited

OTHER PUBLICATIONS

D. Blake et al, "Photocatalytic and Chemical oxidation of organic compounds in Supercritical carbon dioxide", Project Report, 1997 (Year: 1997).*

Y. Ku et al, "Reduction of dissolved carbon dioxide in aqueous solution by UV-LED/TiO2 process under periodic illumination", Journal of CO2 Utilization, 41 (2020) (Year: 2020).*

* cited by examiner

PHOTOCATALYTIC BATCH REACTOR OPERABLE FOR CONVERTING GASEOUS, LIQUID, AND SUPERCRITICAL CARBON DIOXIDE

CROSS-REFERENCES TO RELATED APPLICATIONS

This application claims the benefit of U.S. Provisional Application No. 63/345,862 filed May 25, 2022, the entire contents of which are hereby incorporated for all purposes in their entirety.

BACKGROUND OF THE INVENTION

A photocatalytic reactor can convert reactants into products by introducing light and a catalyst to induce a photocatalysis process.

DETAILED DESCRIPTION OF THE INVENTION

Certain aspects and features of the present disclosure relate to a reactor that can enable carbon-dioxide conversion reactions to take place under a wide range of parameters and conditions. In some examples, the reactor can be a versatile photocatalytic batch reactor. In some examples, the reactor can operate with carbon-dioxide in a gas state, a liquid state, a supercritical state, or any combination thereof. The reactor can be capable of operating at temperatures of at least 250° C. and pressures of at least 80 bar. The reactor can operate under any form of light irradiation type and source, such as UV irradiation, visible light irradiation, solar irradiation, or any combination thereof. In some examples, a high-pressure pump can introduce a reducing agent to the carbon-dioxide, where the reducing agent can be in a gas state, a liquid state, a supercritical state, or any combination thereof. The reactor can collect gaseous reaction products as well as liquid-soluble reaction products. The reactor can be configured to receive a photocatalyst. The photocatalyst may be introduced in powder form or in a thin film that can be supported on a substrate. In some examples, the reactor can carry out any other type of photocatalytic reactions for air purification, water remediation, or any other suitable application.

The reactor can also be operable to perform non-catalytic photo-induced reactions and catalytic non-photo-induced reactions.

Figure 1:
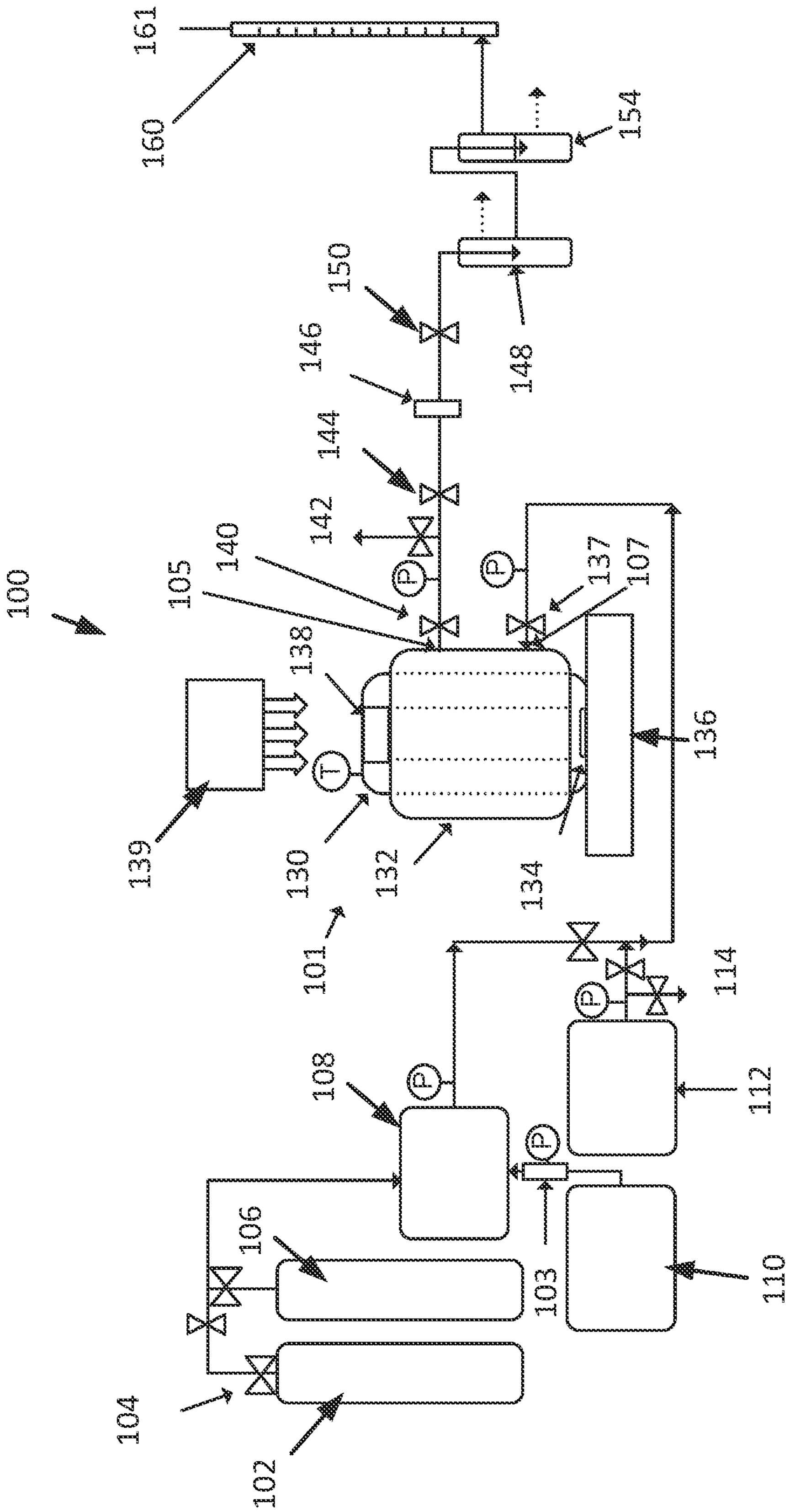
FIG. 1 is a schematic of a photocatalytic batch reactor operable for converting gaseous, liquid, and supercritical carbon-dioxide according to certain aspects of the present disclosure.

FIG. 1 is a schematic of an example of a photocatalytic batch reactor 100 operable for converting gaseous, liquid, and supercritical carbon-dioxide. In some examples, the photocatalytic batch reactor can include a reactor vessel 101 that can contain reactants.

The reactor vessel 101 can include a housing 130 having an interior volume. In some examples, the housing 130 can be cylindrical. The reactor vessel 101 can be cylindrical and made of a metal, such as stainless steel or aluminum. In some examples, the reactor vessel 101 can be made of a combination of metals. In some examples, the volume of the reactor vessel 101 can be roughly 110 mL.

Additionally, the reactor vessel 101 can include a top lid 138 The top lid 138 can be opened or closed by tightening or loosening screws or other fasteners that may fasten the top lid 138 to the reactor vessel 101, for example.

A light source 139 can be positioned proximate to one or more of the circular sides of the reactor vessel 101 or placed on top of, above, or over the reactor vessel 101. Light emitted from the light source 139 can be transmitted through a window and into the reactor vessel 101. In some examples, the window may be positioned in the top lid 138. For example, the top lid 138 may include an open center that can be sized to receive a suitable light permeable material, such as sapphire glass or any other suitable material. The cylindrical sapphire glass can be held in place on top of the reactor vessel 101 using rubber O-rings, for example. The light emitted from the light source 139 can enable a photocatalytic reaction between a photocatalyst and carbon-dioxide present in the reactor vessel 101.

In some examples, the contents of the reactor can be stirred using a magnetic stirrer 136. For example, the magnetic stirrer 136 can exert a magnetic force on a magnet 134 within the reactor vessel 101. The magnet 134 can be moved based on the magnetic force and can stir the contents of the reactor vessel 101 as a result.

The reactor vessel 101 can include openings for receiving and/or expelling substances. For example, the reactor vessel 101 can include an inlet 107 for receiving reactants, and an outlet 105 for expelling reaction products. The inlet 107 can include an inlet valve 137 for controlling fluid flow with respect to the inlet 107. In some examples, the inlet valve 137 can be a needle valve, or any other suitable valve.

The reactor 100 can include a gas carbon-dioxide container 102 that is configured to contain carbon-dioxide in a gaseous state. In some examples, the pressure of the gas carbon-dioxide container 102 can be regulated up to 10 bars and/or may be capable of operating with at least 10 bars.

The reactor 100 can also include a liquid carbon-dioxide container 106 that is configured to contain carbon-dioxide in a liquid state. The liquid carbon-dioxide container 106 can include a tube that can withdraw liquid carbon-dioxide from the liquid carbon-dioxide container 106. The liquid carbon-dioxide container 106 pressure can be the equilibrium pressure at room temperature, which can be around 62 bar.

The reactor 100 can include a carbon-dioxide pump 108. The carbon-dioxide pump 108 can be coupled with the reactor vessel 101, the gas carbon-dioxide container 102, the liquid carbon-dioxide container 106, and an air compressor 110. The air compressor 110 can include a pressure regulator 103 for regulating air pressure from the air compressor 110. Liquid carbon-dioxide can be compressed by the carbon-dioxide pump 108 to generate carbon-dioxide in the supercritical phase. The carbon-dioxide pump 108 can operate with the help of the air compressor 110.

The reactor 100 can include a high-pressure pump 112 that can be used as a controlled injection system for fluids at high pressure. The high-pressure pump 112 can flow streams of high-pressure liquids or supercritical fluids, such as fluids that can be miscible with water or organic solvents. The high pressure pump 112 can be a specialized pump with a fine control system to regulate the flow rate.

The reactor 100 can include a heating jacket 132 that can couple with a temperature controller and temperature sensor. The reactor 100 can use the temperature controller and the heating jacket 132 to control and maintain the temperature of the photocatalytic reaction taking place within the reactor vessel 101. In some examples, the temperature controller and the heating jacket 132 can be used to control a temperature associated with the reactor 100. For example, the heating jacket 132 can be used to maintain a suitable range of temperatures for processing a particular phase of carbon-dioxide that may be present in the reactor vessel 101. In an illustrative example, the reactor vessel 101 can process a supercritical phase of carbon-dioxide, and the heating jacket 132 can apply heat to the reactor vessel to maintain a temperature suitable to maintain the supercritical phase of carbon-dioxide.

In use, after the addition of photocatalyst, the reactor 100 can be sealed by tightening the reactor's top lid. 138. The reactor 100 can be purged with a feed. In some examples, the feed can be introduced via a purge line 114. The feed can include pure carbon-dioxide or a mixture of carbon-dioxide and a reducing agent. The feed can be used to remove air and any other impurities that may be present inside the reactor vessel 101. After purging, the flow can be stopped when the batch reactor 100 is sufficiently saturated with the feed. In cases where the reaction is not run in the gas phase, the magnetic stirrer 136 can be used. After loading the photocatalyst and purging/saturating the reactor 100 with the feed, a reactivity test can be initiated by turning on the light source 139.

The reactor vessel 101 can be coupled with an outlet valve 140. The outlet valve 140 can enable and disable the flow of reaction products from the outlet 105 of the reactor vessel 101. The outlet valve 140 can be opened to enable product sampling. For example, the outlet valve 140 can be opened to enable reaction products contained within the reaction vessel 101 to flow from the reaction vessel 101 and into one or more samplers for sampling. When sampling, the pressure in the reactor vessel 101 can drop slightly. The magnetic stirrer 136 can uniformly mix the photocatalyst with liquid or supercritical carbon-dioxide.

The reactor 100 can include a gas-phase sampler 148 for collecting gas-phase products. For example, the gas-phase sampler 148 can include a septum and a gas-tight syringe. A portion of the gas-phase sampler 148 can be filled with glass beads to reduce the sampling volume.

The reactor 100 can also include a liquid-phase sampler 154, in which water-soluble products may be collected and later transferred to HPLC vials. The liquid-phase sampler 154 can contain de-ionized (DI) water, which may serve as a solvent for the collection of products in the liquid phase. The DI water can trap the gaseous products in the gas sampler. The DI water in the liquid-phase sampler 154 can be replaced after each sampling point.

The reactor 100 can include an outlet valve 140 that can regulate the outlet flow rate from the outlet 105. The outlet valve 140 can be heated to prevent products from condensing. In some examples, the outlet valve 140 can be a needle valve, or any other suitable valve. In some examples, the reactor 100 can include a vent line 142. Additionally, the reactor 100 can include a heated needle valve 144 that can be positioned downstream with respect to the outlet valve 140. The heated needle valve 144 can prevent reaction products from condensing while passing through the heated needle valve 144.

During sampling, the flow rate can be set by a mass flow controller 146 while the outlet valve 140 is opened or closed. This can ensure that the same amount of product is collected at every sampling point. The mass flow controller 146 can be coupled to an ON/OFF valve 150 that can enable or prevent fluids from flowing from the mass flow controller 146. The outlet stream can pass from the outlet valve 140 and into a gas-phase sampler 148 and then into the liquid-phase sampler 154. Gas-phase products can be analysed using gas a chromatograph (GC) while liquid-phase products in a high-performance liquid chromatograph (HPLC). For example, the gas-phase sampler 148 can be coupled to the GC and the liquid-phase sampler 154 can be coupled with the HPLC. To ensure that the products are forming from the reduction of carbon-dioxide, a control test can be performed. In the test, argon gas can used instead of carbon-dioxide and the photoreactivity test can be run. In some examples, a C13 analysis can also be performed.

The reactor 100 can include a flowmeter 160 with a vent 161. The flowmeter 160 can measure the flow rate at the outlet 105 of the reactor 100.

In some examples, the reactor 101 can be operable in a gas state in which gaseous carbon-dioxide is supplied to the reactor vessel 101 from the gas carbon-dioxide container 102. Additionally, the reactor 101 can be operable in a liquid state in which liquid carbon-dioxide is supplied to the reactor vessel 101 from the liquid carbon-dioxide container 106. Additionally, the reactor 101 can be operable in a supercritical state, in which supercritical carbon-dioxide is supplied via the carbon-dioxide pump 108.

Figure 2:
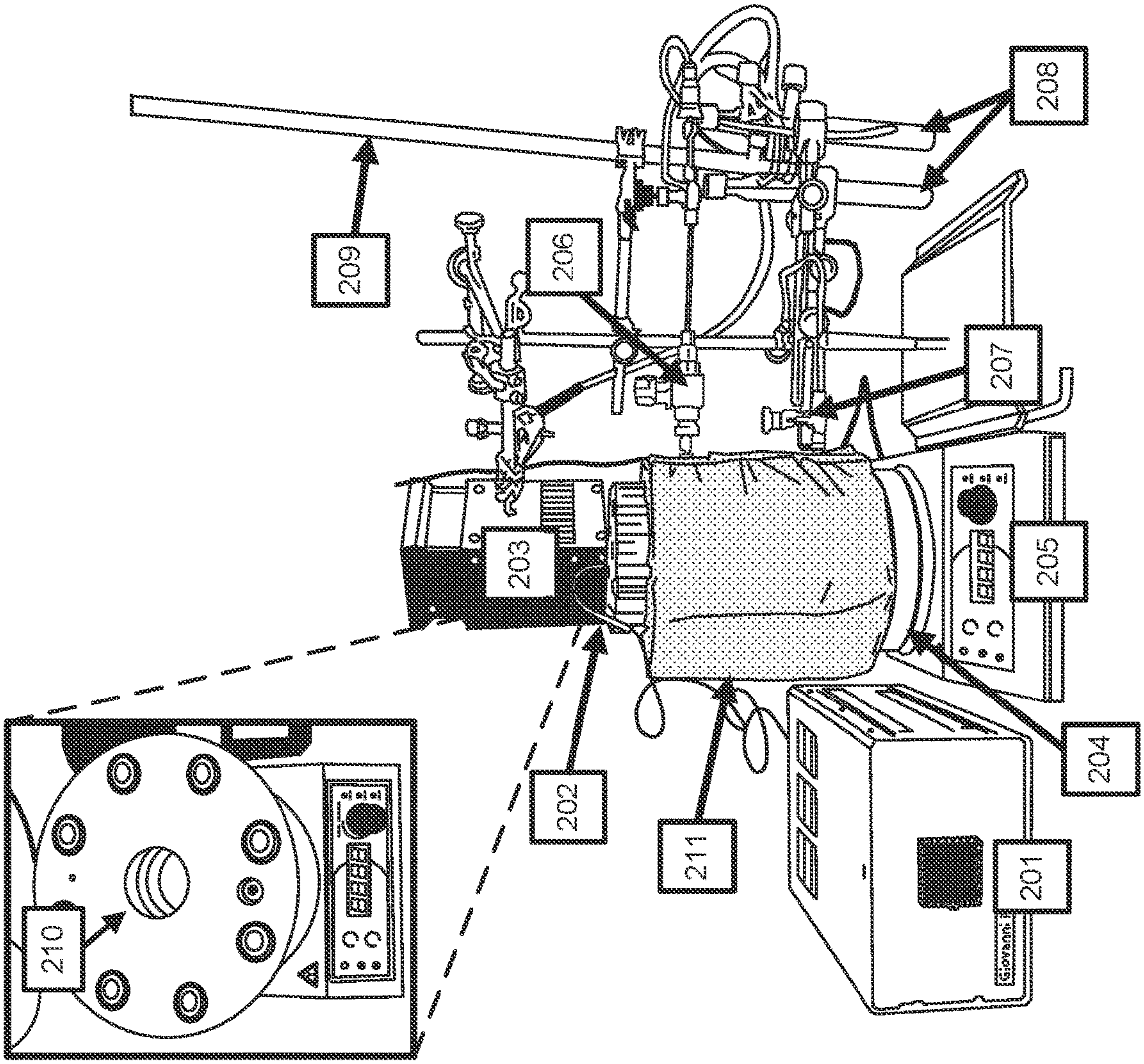
FIG. 2 is an illustration of an exemplary laboratory setup including a photocatalytic batch reactor operable for converting gaseous, liquid, and supercritical carbon-dioxide according to certain aspects of the present disclosure.

FIG. 2 is an illustration of an exemplary laboratory setup including a photocatalytic batch reactor operable for converting gaseous, liquid, and supercritical carbon-dioxide according to certain aspects of the present disclosure. FIG. 2 shows a reactor vessel 204 with a heating jacket 211 thereon. The reactor vessel 204 is shown atop a magnetic stirrer 205 that is configured to magnetically stir the contents of the reactor vessel 204. The reactor vessel 204 is shown beneath an ultraviolet lamp 203. The ultraviolet lamp 203 is configured to shine light into the reactor vessel 204 via a sapphire window 210 atop the reactor vessel 204. The reactor vessel 204 is shown coupled to an outlet valve 206 and an inlet valve 207. The outlet valve 206 is shown coupled to a pair of gas sampling tubes 208 that can be used to sample gas received from the outlet valve 206. The gas sampling tubes 208 are shown coupled to a volumetric flow meter 209 that can be used to determine a flow rate of fluids passing through the volumetric flow meter 209. The reactor vessel 204 is shown coupled to a temperature sensor 202 that can be used to sense a temperature associated with the reactor vessel 204. The temperature sensor 202 can be used in conjunction with a temperature controller 201. The temperature controller 201 can adjust the temperature of the reactor vessel 204 via the heating jacket 211. In some examples, the temperature controller 201 can adjust the temperature of the reactor vessel 204 based on temperature data received from the temperature sensor 202.

Figure 3A:
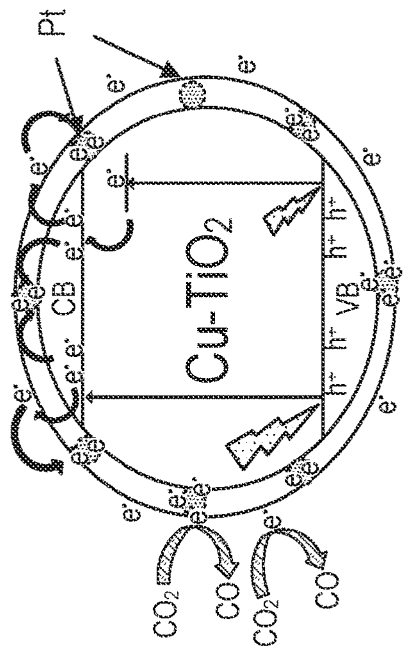
FIGS. 3A and 3B show a schematic of a dopant molecule usable with a photocatalytic batch reactor operable for converting gaseous, liquid, and supercritical carbon-dioxide according to certain aspects of the present disclosure, and a graph of energy data associated therewith.

The photocatalytic reduction of liquid or supercritical carbon-dioxide can lead to enhancement in product yields. In this work, the photocatalytic conversion of liquid carbon-dioxide at room temperature conditions can be investigated under UV light irradiation. A suitable photocatalyst, namely a copper-doped brookite-rutile $TiO2$ photocatalyst that can be photo-deposited with platinum nanoparticles and impregnated with reduced graphene oxide (rGO—(Pt/Cu—TiO2)), can be used in the reactor, as shown in FIG. 3A. The experimental work can be complemented with DFT calculations on model brookite and rutile TiO2 surfaces with atomic Cu located on the surface or in the lattice of TiO2. Cu doping can alter the electronic properties and performance of the photocatalyst. Subsequently, the role of Cu in carbon-dioxide adsorption can be systematically studied by performing comparative studies on reaction pathways for the reduction of carbon-dioxide into CO.

The copper-doped (1 wt. %) brookite-rutile TiO2 (Cu—TiO2) can be prepared by following a simple sol-gel procedure. Next, platinum (0.5 wt. %) can be photo-deposited on Cu—TiO2. Then, reduced graphene oxide (0.5 wt. %) can be impregnated on Pt/Cu—TiO2. The material can be characterized by XRD, Raman, UV-vis DRS, PL, FT-IR, TEM, STEM-EDS, TPD, among others. A custom-built batch reactor 100 used to test the photocatalytic activity of the different catalysts in reducing carbon-dioxide can be designed in-house and can be shown in FIG. 1. The calculations can be carried out using the plane-wave-based DFT method as implemented in the Vienna ab Initio Simulation Package (VASP). In the presence of liquid phase, the solvation effect can be considered during the energy and geometry optimization based on the periodic continuum solvation model as implemented in the VASPsol code.

Figure 3B:
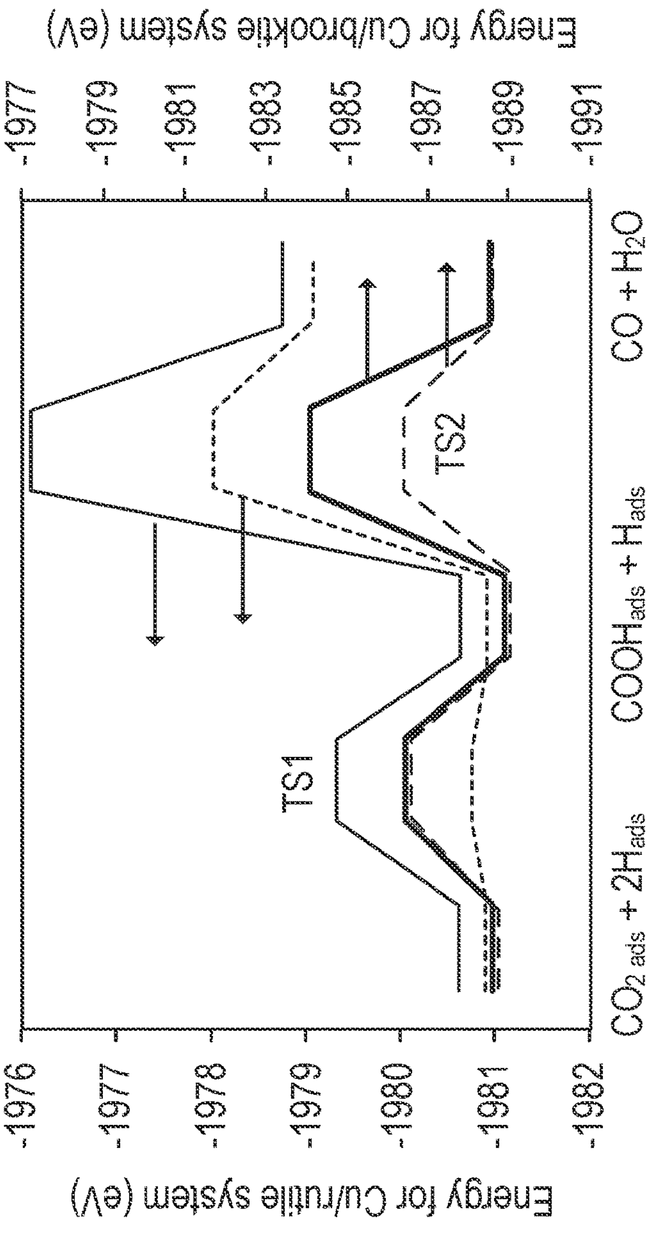

FIG. 3A shows a schematic of a dopant molecule usable with a photocatalytic batch reactor operable for converting gaseous, liquid, and supercritical carbon-dioxide according to certain aspects of the present disclosure, and FIG. 3B shows a graph of energy data associated therewith. The photocatalyst molecule is shown having copper and titanium dioxide.

Figure 4B:
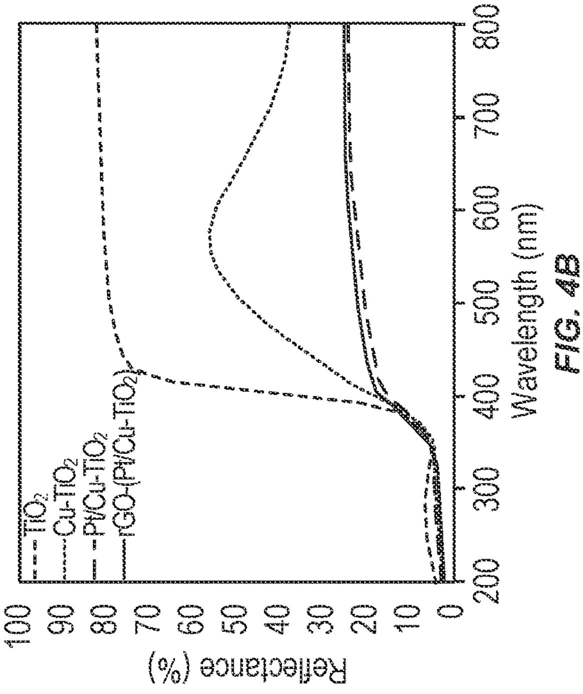
FIGS. 4A, 4B, and 4C show graphs related to characteristics of different catalyst samples, according to certain aspects of the present disclosure.
Figure 4A:
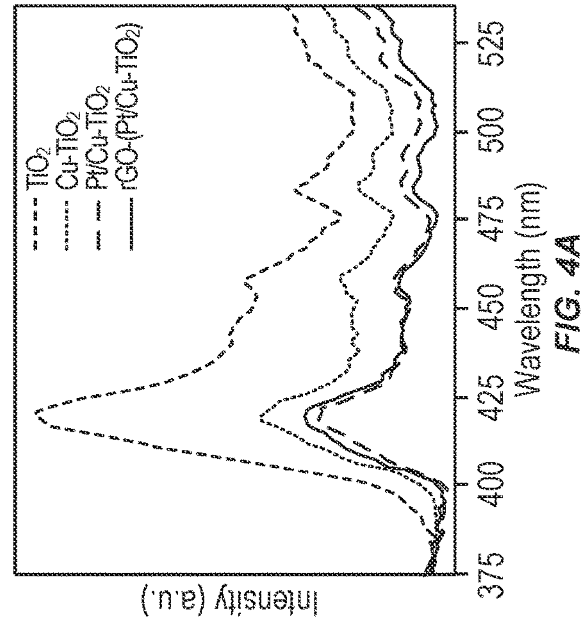
Figure 4C:
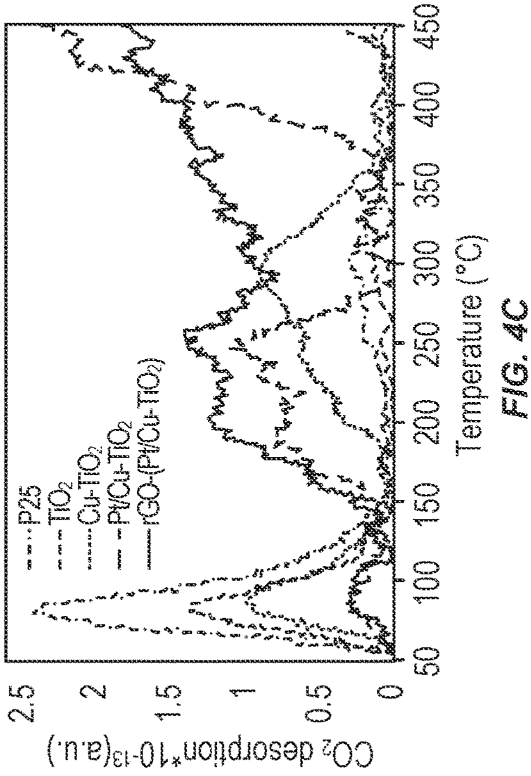

FIGS. 4A, 4B. and 4C show graphs related to characteristics of different catalyst samples, according to certain aspects of the present disclosure. In particular, FIG. 4A depicts photoluminescence spectra associated with photocatalyst dopant molecules. The photoluminescence spectra can be used to determine photocatalytic activity of photocatalysts during a reaction taking place in the reactor. FIG. 4B depicts UV-vis diffuse reflectance spectra associated with the photocatalyst dopant molecules. FIG. 4C depicts carbon-dioxide temperature-programmed desorption peaks of different photocatalyst molecules.

Figure 5:
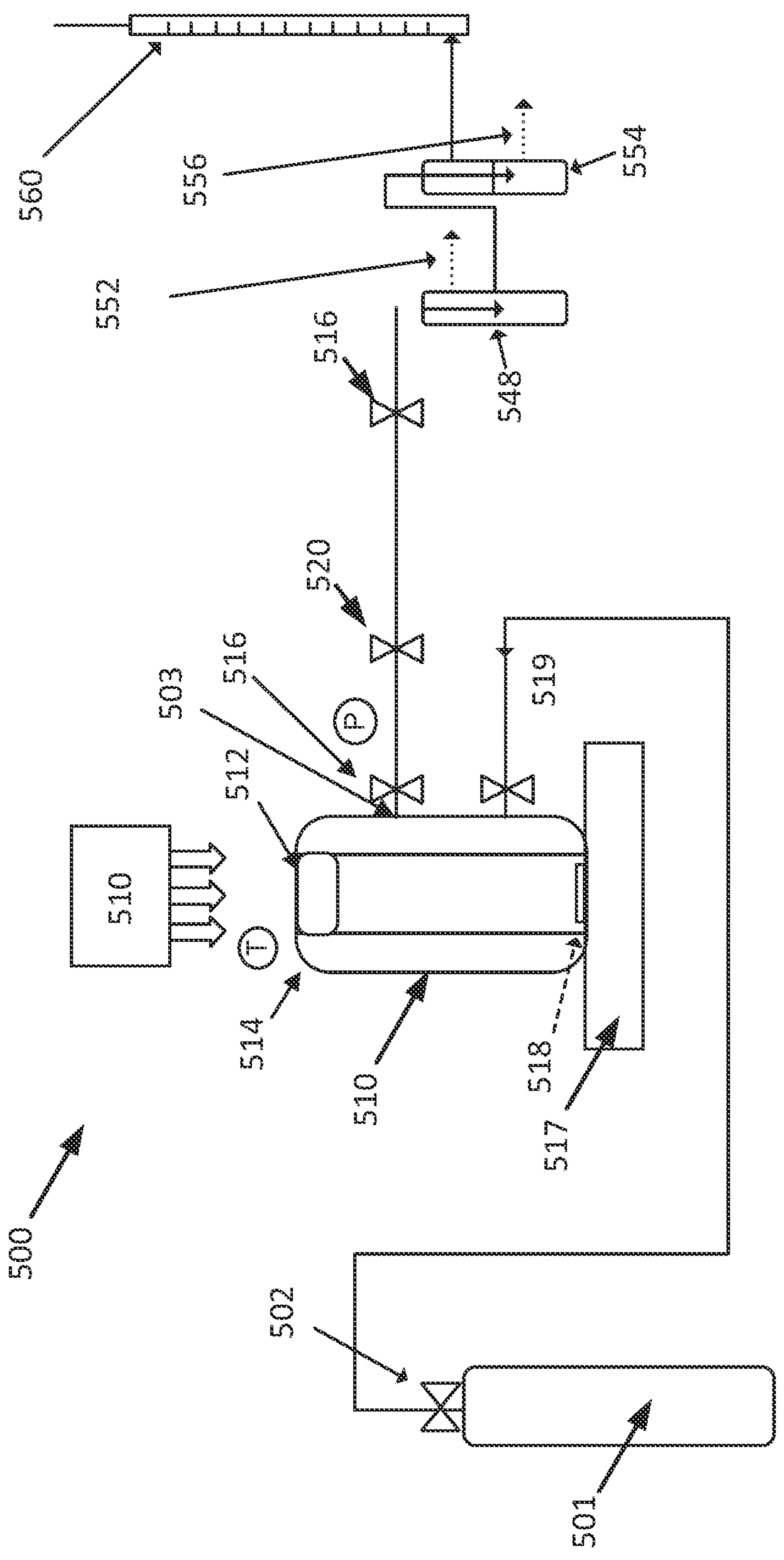
FIG. 5 is a schematic of an alternate configuration for a photocatalytic batch reactor according to certain aspects of the present disclosure.

FIG. 5 is a schematic of an alternate configuration for a photocatalytic batch reactor operable for converting gaseous, liquid, and supercritical carbon-dioxide according to certain aspects of the present disclosure. The reactor 500 includes a carbon-dioxide container 501 that can contain gaseous carbon-dioxide, liquid carbon-dioxide, or a combination thereof. The carbon-dioxide container 501 includes a pressure regulator valve that is configured to regulate the pressure of carbon-dioxide flowing therefrom. The carbon-dioxide container 501 is shown coupled to the reactor vessel 510 via an inlet needle valve 519. The reactor can include a sapphire window 512 that can transmit light from a light source 510 into an interior of the reactor vessel 510. The reactor 500 can include a magnetic stirrer 517 that can be configured to stir the contents of the reactor vessel 510 via a magnet 518 that is positioned within the reactor vessel 510. The reactor 500 includes an outlet 503 for expelling reaction products from the reactor vessel 510. The outlet 503 can be coupled to an outlet valve 516 that can enable or disable the flow of reaction products from the reactor vessel 510. The reactor 500 can include a needle valve 520 for retrieving reaction products from the reactor vessel 510 and transmitting the reaction products elsewhere. The needle valve 520 can be coupled to an ON/OFF valve 516 that can enable or disable the flow of reaction products past the ON/OFF valve 516. A gas sampler 548 and/or a liquid sampler 554 can be included in the flow path from the outlet 503. A flow meter 560 can also be included, such as for measuring an amount of fluid flow therethrough.

In the preceding description, various embodiments have been described. For purposes of explanation, specific configurations and details have been set forth in order to provide a thorough understanding of the embodiments. However, it will also be apparent to one skilled in the art that the embodiments may be practiced without the specific details. Furthermore, well-known features may have been omitted or simplified in order not to obscure the embodiment being described.

Some embodiments of the present disclosure include a system including one or more data processors. In some embodiments, the system includes a non-transitory computer readable storage medium containing instructions which, when executed on the one or more data processors, cause the one or more data processors to perform part or all of one or more methods and/or part or all of one or more processes and workflows disclosed herein. Some embodiments of the present disclosure include a computer-program product tangibly embodied in a non-transitory machine-readable storage medium, including instructions configured to cause one or more data processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification and variation of the concepts herein disclosed may be resorted to by those skilled in the art, and that such modifications and variations are considered to be within the scope of this invention as defined by the appended claims.

The description provides preferred exemplary embodiments only, and is not intended to limit the scope, applicability or configuration of the disclosure. Rather, the ensuing description of the preferred exemplary embodiments will provide those skilled in the art with an enabling description for implementing various embodiments. It is understood that various changes may be made in the function and arrangement of elements without departing from the spirit and scope as set forth in the appended claims.

Specific details are given in the description to provide a thorough understanding of the embodiments. However, it will be understood that the embodiments may be practiced without these specific details. For example, specific computational models, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

What is claimed is:

1. A photocatalytic batch reactor, comprising:

a reactor vessel comprising a housing defining an interior volume configured to receive a photocatalyst, the housing having an inlet, an outlet, and an opening configured to allow light to pass into the interior volume;

a light source positioned to direct the light into the interior volume through the opening;

a gas carbon-dioxide container coupled with the inlet of the reactor vessel, the gas carbon-dioxide container configured to flow gas carbon-dioxide to the interior volume of the reactor vessel;

a liquid carbon-dioxide container coupled with the inlet of the reactor vessel, the liquid carbon-dioxide container configured to flow liquid carbon-dioxide to the interior volume of the reactor vessel;

a carbon-dioxide pump coupled with the gas carbon-dioxide container, the liquid carbon-dioxide container, and the reactor vessel, wherein the carbon-dioxide pump is configured to pressurize carbon-dioxide en route to the reactor vessel; and an outlet valve coupled with the outlet of the reactor vessel, the outlet valve configured to flow an outlet stream from the interior volume of the reactor vessel, wherein the reactor is operable in at least the following three states:

a gas state in which gas carbon-dioxide is supplied to the reactor vessel from the gas carbon-dioxide container;

a liquid state in which liquid carbon-dioxide is supplied to the reactor vessel from the liquid carbon-dioxide container; and a supercritical state, in which supercritical carbon-dioxide is supplied via the carbon-dioxide pump.

2. The photocatalytic batch reactor of claim 1, further comprising a magnetic stirrer that is positioned proximate the reactor vessel and is configured to stir contents of the reactor vessel via a magnet positioned within the reactor vessel.

3. The photocatalytic batch reactor of claim 1, further comprising a high-pressure pump that is coupled with the reactor vessel for flowing high pressure fluids into the reactor vessel.

4. The photocatalytic batch reactor of claim 1, further comprising:

a gas-phase sampler that is configured to receive gas-phase reaction products from the reactor vessel; and a liquid-phase sampler that is configured to receive liquid-phase reaction products from the reactor vessel.

5. The photocatalytic batch reactor of claim 1, wherein the photocatalytic batch reactor is operable at least at an operating temperature of 250 degrees Celsius and at least at an operating pressure of 80 bar.

6. The photocatalytic batch reactor of claim 1, wherein the outlet valve includes a heated needle valve that is operable to apply heat to reaction products within the heated needle valve for preventing the reaction products from condensing.

7. The photocatalytic batch reactor of claim 1, wherein the opening includes a sapphire crystal.

8. The photocatalytic batch reactor of claim 1, further comprising a heating jacket that is operable via a temperature controller for applying heat to contents of the reactor vessel.

9. The photocatalytic batch reactor of claim 1, wherein the carbon-dioxide pump is coupled with an air compressor that is operable to provide additional pressure to carbon-dioxide flowing through the carbon-dioxide pump.

10. The photocatalytic batch reactor of claim 1, further comprising a flowmeter positioned proximate the outlet valve for measuring and controlling a flow rate of the outlet valve.

* * * * *